INVENTOR
Bernard E. Lenehan.

Oct. 20, 1959
B. E. LENEHAN
2,909,728
MULTIELEMENT INDUCTION INSTRUMENT
Filed Feb. 18, 1957
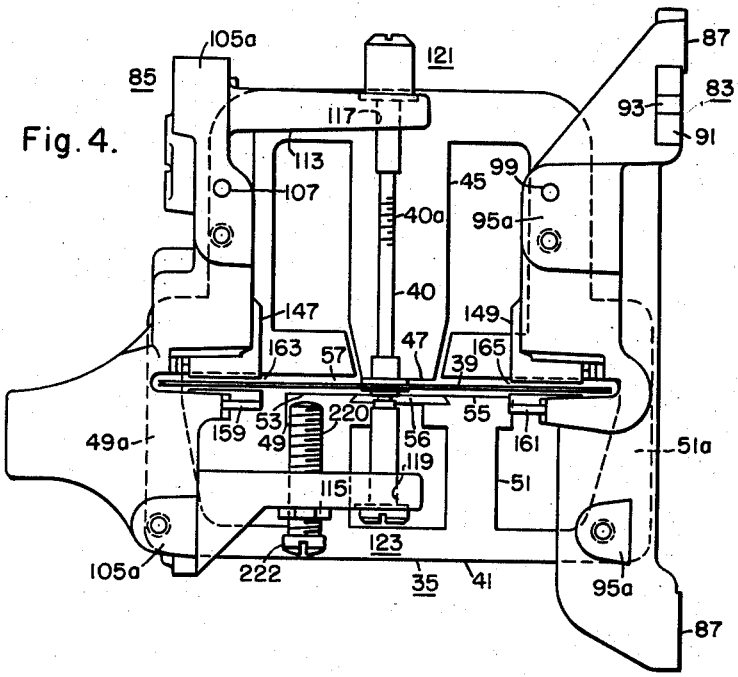
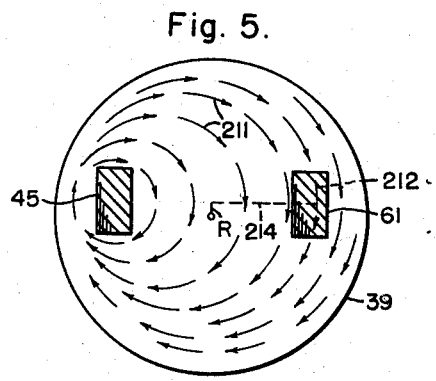
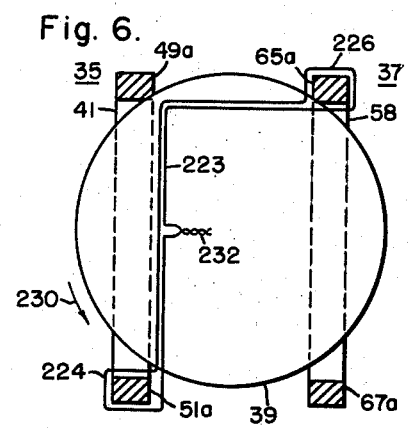
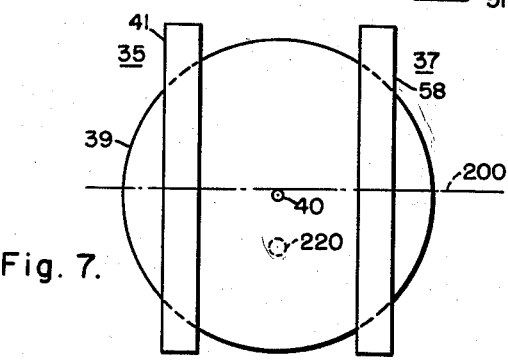

United States Patent Office 2,909,728
Patented Oct. 20, 1959

2,909,728
MULTIELEMENT INDUCTION INSTRUMENT

Bernard E. Lenehan, Bloomfield, N.J., assignor to Westinghouse Electric Corporation, East Pittsburgh, Pa., a corporation of Pennsylvania Application February 18, 1957, Serial No. 640,915

6 Claims. (Cl. 324—107)

This invention relates to multielement induction instruments and has particular relation to multielement induction watthour meters.

Although the invention may be employed in connection with various types of multielement induction instruments such as electrical relays, it will be described in connection with watthour meters for measuring energy of polyphase circuits. In the past, watthour meters have been constructed which include a plurality of electromagnetic driving elements arranged to influence suitable electroconductive armature means. Such armature means have assumed a variety of forms. In order to prevent interference between the driving elements which adversely affects the response of the meter, such meters have previously been provided with a separate armature for each of the driving elements. These armatures are ordinarily supported by a single shaft in vertical spaced relationship when the meter is in an operative position. Although tending to minimize interference between the several elements, such an arrangement has resulted in the provision of a meter of bulky and expensive construction.

According to the present invention, a multielement induction instrument is provided which includes a pair of electromagnetic driving elements positioned to influence a common armature with improved means for compensating for certain undesirable interference between the driving elements. In application Serial No. 517,409, filed on June 23, 1955, by Bernard E. Lenehan, there is disclosed a multielement meter with means for compensating for undesirable interference between the elements. The above-mentioned application discloses a pair of driving elements which are displaced by 180° about the axis of the armature in order to compensate for so-called voltage interference torques which are produced by interactions between the voltage flux of one element with currents in the armature produced by voltage flux of the other element. In practice, however, it has been found difficult to provide the desired 180° arrangement of the driving elements. Consequently, it is observed that small voltage interference torques may still exist due to the displacement of the driving elements by an angle other than 180°. Although these small torques, if present, can be tolerated in many applications, their elimination is desirable.

According to the present invention, a multielement meter is provided which includes a pair of driving elements arranged with respect to a common armature such that the elements produce a voltage interference torque with means for compensating for the intentionally produced torque. Such compensating means may take the form of compensating torque producing means effective to produce a torque acting upon the armature in opposition to the voltage interference torque. The compensating means is preferably in the form of an adjustable magnetic element positioned to divert magnetic flux from the driving elements through the armature for producing an adjustable compensating torque for permitting a substantial range of compensation.

It has been observed that the voltage flux of the driving elements can be responsible for additional small torques which may adversely affect the response of the meter. These additional torques are referred to hereinafter as "creep" torques and appear to be the result of interactions between the voltage fluxes of the elements and leakage fluxes which are displaced in phase from the voltage fluxes. The creep torques, when present, are small and may be tolerated for many applications. However, the invention further provides means for compensating for these creep torques. These creep torques are observed to have magnitudes which differ for phase displacements between the phase voltages energizing the driving elements of 0° and 180° for constant values of the phase voltages. According to the invention, additional compensating means is provided to produce compensating torques which are effective to provide equal magnitudes of the creep torques for phase displacements between the energizing voltages of 0° and 180°. This arrangement permits the elimination of the undesirable creep torques by adjustment of a conventional light load adjuster which is associated with the meter.

It is, therefore, an object of the invention to provide a multielement induction instrument of improved construction.

It is another object of the invention to provide an induction watthour meter having a pair of driving elements arranged to influence a common armature with improved means for compensating for undesirable torques produced by interaction between the driving elements.

It is a further object of the invention to provide an induction watthour meter having a pair of driving elements arranged such that a voltage interference torque is produced with means for compensating for the interference torque.

It is still another object of the invention to provide an induction watthour meter having a pair of driving elements arranged to influence a common armature such that undesirable creep torques are produced having magnitudes which differ for two different phase displacements between voltages energizing the elements with means for providing equal magnitudes of the creep torques for the two phase displacements.

Other objects of the invention will become apparent from the following description taken in conjunction with the accompanying drawings, in which:

Fig. 4 is a view in side elevation of the meter of Fig. 1 with parts removed;

Fig. 5 is a view in top plan of the armature of the meter of Fig. 1 with parts shown diagrammatically illustrating certain electrical quantities present in the meter of Fig. 1;

Fig. 6 is a view in bottom plan of the meter of Fig. 1 with parts shown in section illustrating compensating means for the meter of Fig. 1, and Fig. 7 is a view in top plan of the meter of Fig. 1 illustrating additional compensating means.

Figure 1:
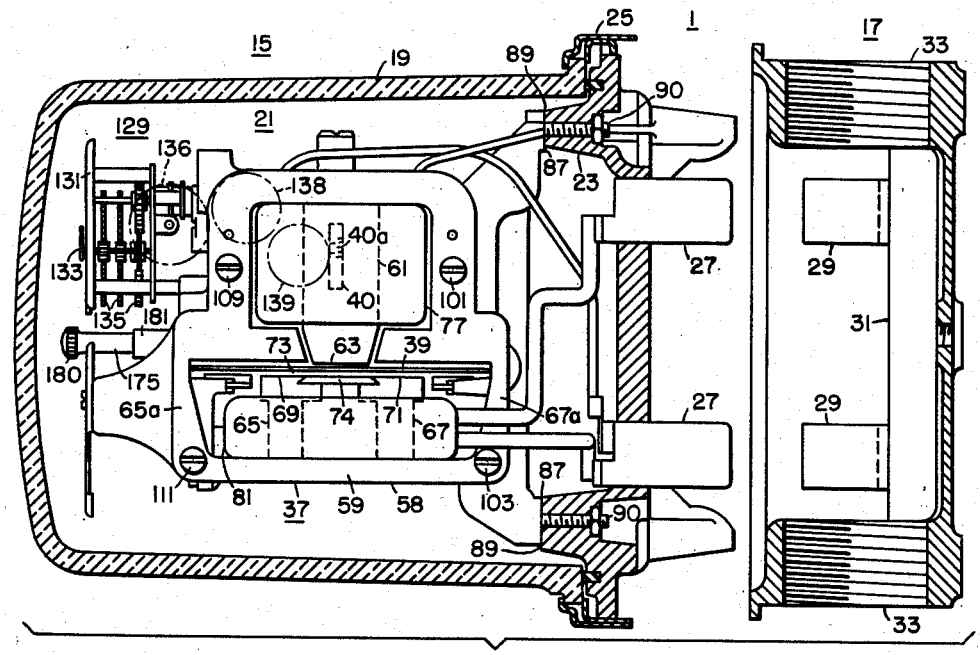
Figure 1 is a view in side elevation with parts shown in section of a detachable type induction meter including cover and socket receptacles embodying the teachings of the invention.

Referring to the drawings, there is illustrated in Fig. 1 a multielement induction meter represented generally by the numeral 1 and embodying the teachings of the invention. For purposes of discussion it will be assumed that the meter 1 is in the form of a watthour meter effective for measuring the energy of a three-wire alternating current circuit 3 shown in Fig. 2. The meter 1, however, may assume other forms such as an induction relay device.

Figure 2:
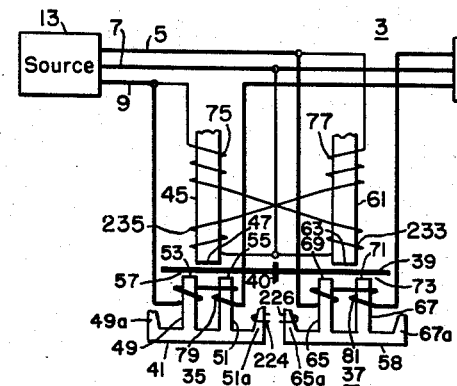
Fig. 2 is a schematic diagram illustrating circuit connections for the meter of Fig. 1.

The circuit 3 as illustrated in Fig. 2 is assumed to be in the form of a three-wire polyphase circuit operating at a frequency of 60 cycles per second having phase conductors 5, 7 and 9 connecting a suitable load device 11 for energization from a suitable source of alternating current 13. Connections of the meter 1 to the circuit 3 will be described hereinafter.

As shown in Fig. 1, the meter 1 is in the form of a detachable meter having a cover receptacle 15 adapted for detachable engagement with a suitable socket receptacle 17. As shown in Fig. 1, the receptacles 15 and 17 are in a detached condition. The cover receptacle 15 includes a cover 19 preferably formed of a transparent material such as glass. The cover 19 is positioned to surround operating parts 21 of the meter which are secured to a suitable base plate 23. The cover 19 is also secured to the base plate by means of a rim structure 25. The base plate 23 is provided with a plurality of contact blades 27 to which certain of the parts 21 are electrically connected.

The socket receptacle 17 is provided with a plurality of contact jaws 29 which are mounted on an insulating support 31 of the receptacle 17. The receptacle 17 further includes a pair of opposed threaded openings 33 for receiving a suitably threaded conduit (not shown), which houses the conductors 5, 7 and 9 which are electrically connected to the jaws 29. In order to condition the meter 1 for energization, the cover receptacle is positioned relative to the socket receptacle with the blades 27 in engagement with the jaws 29.

Figure 3:
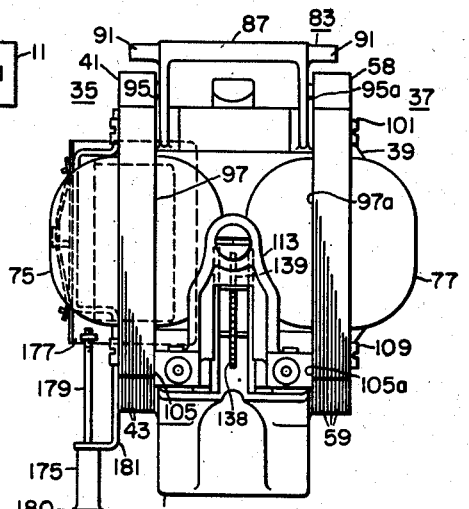
Fig. 3 is a view in top plan of the instrument of Fig. 1 with parts removed.

As illustrated in Figs. 1, 3 and 4, the meter 1 includes a pair of electromagnetic driving elements represented generally by the numerals 35 and 37. Each of the elements 35 and 37 is arranged to influence a suitable electroconductive armature illustrated in the form of a disc 39 which may be constructed of any suitable electroconductive material such as aluminum. The disc is mounted for rotation relative to the elements 35 and 37 about an axis by means of a shaft 40 which includes a threaded portion 40a adapted to engage a suitable gear forming part of coupling means coupling the shaft to a suitable register referred to hereinafter. Details of construction of the elements 35 and 37 are best shown in Figs. 1 and 4.

As illustrated in Fig. 4, the element 35 includes a magnetic structure 41 preferably formed of a plurality of identical magnetic laminations 43 as shown in Fig. 3. The laminations are preferably formed of a low loss magnetic material such as high silicon steel. The structure 41 includes a voltage magnetic pole 45 having a pole face 47 and a pair of spaced current magnetic poles 49 and 51 having respectively pole faces 53 and 55. The pole faces 53 and 55 are located in a common plane which is spaced from and parallel to the plane defined by the pole face 47 to define an air gap 57. A suitable magnetic shunt 56 may be positioned between the current poles 49 and 51 to provide overload compensation as is well known in the art. The structure 41 further includes a pair of spaced arms 49a and 51a which provide paths for magnetic flux emanating from the voltage pole 45 as will be described more fully hereinafter.

As illustrated in Fig. 1, the element 37 includes a magnetic structure 58 which may be of identical construction as the structure 41. The structure 58 is formed of a plurality of magnetic laminations 59 as shown in Fig. 3 and is provided with a voltage pole 61 having a pole face 63 and a pair of spaced current magnetic poles 65 and 67 having respectively pole faces 69 and 71. The poles 61, 65 and 67 define an air gap 73. A magnetic shunt 74 is positioned between the poles 65 and 67. The structure 58 also includes spaced arms 65a and 67a providing paths for magnetic flux emanating from the pole 61.

In order to permit energization of the meter 1, the elements 35 and 37 include suitable voltage windings 75 and 77 which surround respectively the poles 45 and 61. The windings 75 and 77 are preferably formed of a large number of turns of small cross-section conductor. The elements 35 and 37 also include respectively a pair of current windings 79 (see Fig. 2) positioned to surround the poles 49 and 51 and a pair of current windings 81 positioned to surround the poles 65 and 67. The windings 79 and 81 are preferably formed of a relatively few number of turns of large cross-section conductor as compared to the windings 75 and 77. In order to produce a response representative of energy of the circuit 3, the meter 1 is connected to the circuit 3 as shown in Fig. 2.

For purposes of illustration, the meter 1 is shown in Fig. 2 in diagrammatic form with the magnetic structures 41 and 58 rotated about the axes of their voltage poles by 90° in a clockwise direction from the actual positions thereof which is in a pair of parallel planes extending transverse to the plane of the paper. As shown in Fig. 2, the voltage winding 75 is connected for energization from the circuit 3 in accordance with voltage appearing between the phase conductors 7 and 9. The voltage winding 77 is connected for energization from the circuit 3 in accordance with voltage appearing between the phase conductors 5 and 7. The current windings 79 are connected for series energization in accordance with current in the conductors 9 whereas the current windings 81 are connected for series energization in accordance with current in the conductor 5. With these connections the meter 1 will be energized to produce rotation of the disc 39 in accordance with energy of the circuit 3.

In order to mount the parts 21 of the meter in operative positions a suitable supporting frame assembly is provided which is of two-part construction including a rear part 83 and a front part 85. The rear part 83 is adapted to mount the structures 41 and 58 in a pair of spaced parallel planes extending between front and rear areas of the meter with the air gaps 57 and 73 in alignment in a plane transverse to the planes of the structures 41 and 58. The part 83 is conveniently supported by the base plate 23 to support the structures 41 and 58. For this purpose the part 83 includes spaced rear surfaces 87 as shown in Fig. 4 which engage cooperating surfaces 89 of the base plate 23 as shown in Fig. 1. The part 83 is secured to the base plate by suitable securing means 90. Projections 91 (see Fig. 3) having openings 93 extend from opposing side surfaces 95 and 95a of the part 83 for engagement with suitable projections (not shown) of the plate 23.

The part 83 and the structures 41 and 58 are positioned with the side surfaces 95 and 95a of the part 83 in engagement with side surfaces 97 and 97a of the structures 41 and 58. Suitable pins 99, as shown in Fig. 4, project from the surfaces 95 and 95a to engage openings of the surfaces 97 and 97a. The structures 41 and 58 may be secured to the part 83 such as by suitable securing means 101 and 103 shown in Fig. 1, which extend through a pair of vertically spaced sets of aligned openings of the structures 41 and 58 and of the part 83 as viewed in Fig. 1.

The frame part 85 is conveniently supported by the structures 41 and 58 at the front area of the meter as viewed in Fig. 1. To this end the part 85 includes side surfaces 105 and 105a which engage the side surfaces 97 and 97a of the structures 41 and 58. Suitable pins 107 shown in Fig. 4, extend from the surfaces 105 and 105a to engage openings of the surfaces 97 and 97a. Suitable securing means 109 and 111, shown in Fig. 1, may be passed through a pair of vertically spaced sets of aligned openings of the structures 41 and 58 and of the part 85. It is observed with reference to Fig. 4 that the part 85 is provided with a pair of spaced projections 113 and 115 which are spaced in the vertical direction to project from the rear of the part 85 toward the front of the part 83. These projections have suitable openings 117 and 119 in vertical alignment as viewed in Fig. 4. Suitable upper and lower bearing assemblies 121 and 123 are supported by the projections 113 and 115 to mount the shaft 40 for rotation about a vertical axis. The projections 113 and 115 are proportioned to mount the disc 39 for rotation through the aligned air gaps 57 and 73 of the structures 41 and 58. The frame parts may be constructed of any suitable material. Preferably, the frame parts are constructed of a non-magnetic electroconductive die-casting material such as an aluminum die-casting alloy.

In order to provide a visual indication of the amount of energy consumed by the load device 11, a suitable register assembly 129 is provided as shown in Fig. 1. The assembly 129 includes a dial plate 131 over which a plurality of pointers 133 pass in response to actuation thereof by suitable gearing 135 which is actuated in turn from the shaft 40 by coupling gears 136, 138 and 139. The assembly 129 is secured to the front surfaces of the frame part 85 in any suitable manner to permit inspection of the plate 131.

For the purpose of damping rotation of the disc 39 one or more permanent magnets may be positioned to influence the disc 39. Preferably two permanent magnets 147 and 149 shown in Fig. 4 are provided at diametrically opposed areas of the disc 39. The magnets may be of identical constructions each having a substantially U-shaped configuration with each magnet having a pair of magnetically opposed poles with pole faces aligned in a common plane. The magnets may be constructed of any suitable magnetic material. Preferably, the magnets are formed of a high coercive magnetic material such as Alnico. The magnets are conveniently mounted within suitable pockets formed in the frame parts 83 and 85. The magnets may be secured within the pockets in any suitable manner with their pole faces lying in a common plane transverse to the shaft 40.

In order to complete the magnetic circuit for the magnets 147 and 149 suitable magnetics bars 159 and 161 are positioned respectively beneath the magnets 147 and 149 as viewed in Fig. 4 to define the poles of the magnet air gaps 163 and 165. The magnetic bars may also be supported by the frame parts such that the air gaps 163 and 165 are aligned in a plane transverse to the shaft 40 to permit rotation of the disc 39 therethrough. Further details of construction of a multielement watthour meter may be found in application Serial No. 517,513, filed June 23, 1955 by James M. Wallace.

In order to control the light load response of the meter 1, suitable light load adjusting means 175 is provided as shown in Fig. 3. The adjusting means 175 may be associated with one or both of the elements 35 and 37. As shown in Fig. 3, the adjusting means is associated only with the element 35 and includes an electroconductive loop 177 positioned beneath the voltage pole 45 in the path of voltage flux to intercept a portion of the voltage flux. The loop 177 is effective to lag the intercepted flux portion to develop a torque which is applied to the disc 39. The loop 177 is mounted for adjustment relative to the pole 45 by suitable actuating mechanism for developing a variable torque. The actuating mechanism includes a screw 179 which threadedly engages a portion of the loop 177 for rotation relative to the loop. The screw 179 has an end portion 180 actuable to rotate the screw to adjust the loop along an axis parallel to the plane of the structure 41. A suitable bracket 181 is carried by the structure 41 to support the screw 179 for rotation.

In induction watthour meters which include two driving elements acting upon a common armature, certain interference between the elements may exist. Such interference results in the establishment of a number of torques acting upon the armature which may adversely affect the response of the meter. Such interference is discussed in detail in the previously referred to application. As there discussed, a first type of interference involves a reaction between current in the armature which is produced by voltage flux of one element and the voltage flux produced by the other element. This type of interference also involves an additional similar reaction between current in the armature produced by voltage flux of the other element and the voltage flux of the one element. This type of interference is referred to as voltage interference. A second type of interference discussed in the above-mentioned application involves a reaction between current in the armature produced by current flux of one element and current flux of the other element. This interference also involves an additional reaction between current in the armature produced by current flux of the other element and current flux of the one element. This interference is referred to as current interference and is observed to have very little effect upon the response of the meter. Consequently, current interference may be ignored for practical purposes.

In the previously described application, an arrangement of the two driving elements is disclosed which is effective to substantially compensate for the torques produced by voltage and current interference. This solution involves the arrangement of the driving elements such that the elements are displaced by 180° with respect to each other about the axis of the associated armature. It has been observed in practice however, that this desired 180° positioning of the driving elements is difficult to obtain with the result that undesirable torques produced by voltage interference still may exist in certain installations.

In accordance with the present invention, the meter 1 includes improved means for compensating for undesirable voltage interference produced by the elements 35 and 37. In the present invention, the elements 35 and 37 are intentionally positioned such that the center lines of the voltage poles 45 and 61 are displaced relative to each other by an angle other than 180° about the axis of the shaft 40. Such arrangement results in the reduction of undesirable torques by voltage interference. One reason for the intentional displacement of the voltage poles is to provide voltage interference torques having magnitudes which are sufficiently large to permit the provision of effective compensating means operable without providing overcompensation. Another reason for such displacement is to define the portion of the disc where the compensating means is to be located. As will appear hereinafter the compensating means and the voltage poles are located on opposing sides of a plane which includes the axis of rotation of the disc. To this end the magnetic structures 41 and 58 are positioned in a pair of spaced parallel planes symmetrically with respect to a line 200 shown in Fig. 7 extending transverse to the planes of the structures. The axis of the shaft 40 is positioned midway between the planes of the structures at one side of the axis of symmetry 200 to extend parallel to the planes of the structures. This arrangement is best shown in Figs. 4 and 7 wherein the shaft 40 is illustrated at the side of the line 200 which contains the front area of the meter.

Referring now to Fig. 5 there is illustrated diagrammatically the voltage poles 45 and 61 positioned with respect to the disc 39 in accordance with the invention. When the pole 45 is energized by applying an alternating voltage to the winding 75, the alternating voltage flux produced thereby cuts the disc 39 to induce alternating voltages in the disc which direct alternating currents about the disc. These currents are represented in Fig. 5 by the curved lines 211 and have instantaneous directions of flow indicated by the associated arrows. It is observed that a portion of the current 211 traverses the disc in the vicinity of the voltage pole 61. This current portion is represented by the dotted line 212 in Fig. 5. The current portion 212 reacts with flux of the pole 61 to establish a force which acts between the pole 61 and the disc 39 along an axis 214 extending transverse to the path of flux of the pole 61 through the disc and to the path of the current portion 212. The resultant direction and magnitude of this force is dependent on the phase relationship between the flux from the pole 61 and the current portion 212. It is observed that the axis 214 passes through a point which is displaced from the center of the disc 39 by a distance R. Consequently, this force tends to effect rotation of the disc in a direction dependent upon the direction of the force. It may be shown in a similar manner that a force is established acting between the pole 45 and the disc 39 by a reaction between flux of the pole 45 and currents produced in the disc by action of flux of the pole 61. The two torques provide a resultant voltage interference torque having a magnitude which is dependent upon the sine of the phase angle between the voltages energizing the poles 45 and 61.

In the present invention suitable torque producing means is provided to apply a compensating torque to the disc which is effective to substantially fully compensate for the previously described voltage interference torque. In the preferred embodiment of the invention illustrated in Fig. 4, the compensating means comprises a magnetic element 220 in the form of a screw which is supported by the projection 115 of the frame part 85 for adjustment relative to the disc 39 towards and away from the disc. The effect of the screw 220 is to divert magnetic flux away from the structures 41 and 58 through the disc such that the diverted flux reacts with current in the disc to produce the desired compensating torque. It is noted with reference to Fig. 7 that the screw 220 is located at the side of the line of symmetry 200 which contains the shaft 40 to establish a compensating torque acting in opposition to the voltage interference torque. Adjustment of the screw 220 is effective to vary the amount of the diverted flux to thereby vary the amount of compensating torque for permitting a wide range of compensation. The screw 220 may contain a slotted head portion 222 for receiving a suitable tool to facilitate rotation of the screw.

It has been observed in certain installations that other undesirable torques may be applied to the disc in addition to the previously described voltage interference torques. These other torques will be referred to hereinafter as "creep" torques. These creep torques are caused by the voltage fluxes of the elements 35 and 37 and appear to be the result of interactions between the voltage fluxes and phase displaced fluxes derived from such voltage fluxes. The effect of the creep torques may be tolerated in many installations. However, in certain installations, it has been found desirable to eliminate the effect of these torques. The existence of these creep torques may be explained as follows:

When the voltage flux of one of the elements such as the element 35 is established, a portion of this voltage flux flows through paths other than the paths provided by the structure 41. For example, a portion of this voltage flux may intersect the frame parts 83 and 85 to induce voltages therein. These induced voltages create currents which flow through the frame parts and which produce fluxes which are displaced in phase with respect to the voltage flux of the element 35. If these displaced fluxes intercept the disc 39 they react with current in the disc produced by voltage flux of the element 35. This interaction results in the establishment of a so-called creep torque. By a similar analysis it may be shown that the element 37 is also responsible for a creep torque which is established by a reaction between the voltage flux of the element 37 and a phase displaced flux created by this voltage flux. These two creep torques provide a resultant creep torque which may in some installations adversely effect the response of the meter and particularly the light load response of the meter.

It is noted that the resultant creep torque just described is not caused by interaction between the elements 35 and 37 but is the result of interaction between flux components emanating from the respective elements 35 and 37. Consequently, this creep torque is observed to have a magnitude which is independent of the phase relationship between the voltages energizing the elements 35 and 37. The magnitude of this creep torque has been observed to be substantially constant for constant energizing voltages for any phase displacement between the energizing voltages. As a result this creep torque may be substantially compensated by the torque produced by the light load adjuster 175.

In the case previously considered, the creep torque discussed was established by the individual driving elements and not by an interaction between these elements. However, additional creep torques referred to hereinafter as interference creep torques may be established by certain interaction between the driving elements. For example, the phase displaced flux produced by the voltage flux of one element such as the element 35 may react with currents in the disc established by voltage flux of the element 37. A similar reaction takes place between the phase displaced flux produced by the voltage flux of the element 37 and the currents in the disc produced by the voltage flux of the element 35. The two reactions result in the establishment of a resultant interference creep torque which may adversely affect the response of the meter and which is dependent upon the cosine of the phase angle between the two voltages energizing the elements 35 and 37 or the two voltage fluxes of the elements. The effect of this interference creep torque is most noticeable under light load energizing conditions of the meter. It has been observed that the magnitude of this interference creep torque for a 0° displacement of the voltage fluxes may differ from the magnitude thereof for a displacement of 180° for conditions of constant energizing voltages. Consequently, the light load adjuster 175 may be employed to compensate for the interference creep torque only for a particular phase displacement between the energizing voltages.

According to the present invention, torque producing means are provided to compensate for the observed difference in magnitudes of the interference creep torque for different phase displacements between the voltage fluxes. The light load adjuster 175 may then be used in conjunction with this compensating means to substantially eliminate the interference creep torque. In the present invention the torque producing means is arranged to produce a compensating torque having a magnitude which varies in accordance with the phase displacement between the voltage fluxes in such a manner that the magnitude of the interference creep torque at 0° displacement of the voltage fluxes is substantially equal to the magnitude thereof at 180° displacement of the voltage fluxes.

In the preferred embodiment of the invention illustrated in Fig. 6, the interference creep torque compensating means comprises electroconductive flux lagging means 223 in the form of a pair of series-connected electroconductive loops 224 and 226 which are positioned to link respectively portions of the voltage fluxes of the elements 35 and 37. As illustrated in Fig. 6, the loop 224 is positioned to surround the magnetic arm 51a of the structure 41 with the loop 226 positioned to surround the magnetic arm 65a of the structure 58. The conductor employed for the means 223 is preferably of deformable construction and may have any suitable resistance effective to provide the desired compensation. The effect of the loops 224 and 226 may be explained as follows:

Let it be assumed that two equal voltages energize the elements 35 and 37 which have a phase displacement of 0°, then the portion of the voltage flux flowing through the arm 51a of the structure 41 is equal in magnitude to and has an in phase relationship with the portion of the voltage flux flowing through the arm 65a of the structure 58. As a result, equal voltages are induced in the loops 224 and 226 which act in the same direction about the series-connected loops with the connection shown to thereby produce a resultant current which flows about the series-connected loops. This current establishes a resultant magnetic flux which is displaced in phase from the voltage flux traversing the arms 51a and 65a. This resultant flux reacts with fluxes in the arms 51a and 65a to thereby establish two torques which act between the structures 41 and 58 and the disc 39 cumulatively. With the arrangement shown in Fig. 6, the two established torques provide a resultant compensating torque which urges the disc 39 in a counterclockwise direction as indicated by the arrow 230 to compensate for an interference creep torque which urges the disc in a clockwise direction. This resultant compensating torque has a maximum magnitude for the in phase condition of the voltage fluxes. If, on the other hand, it be assumed that the energizing voltages are displaced in phase by 180°, it may be shown by a similar analysis that substantially zero current flows about the series-connected loops connected as shown with the result that zero resultant compensating torque is established.

It is observed from the above analysis that the compensating torque produced by the series-connected loops 224 and 226 connected as shown has a magnitude which is greater for a 0° phase displacement between the voltage fluxes of the elements 35 and 37 than the magnitude thereof for a phase displacement of 180°. Consequently, if the interference creep torque has a greater magnitude at 0° displacement of the voltage fluxes than at 180° displacement, the compensating loops connected as shown in Fig. 6 may be proportioned to establish a compensating torque having a magnitude equal to the difference in the magnitudes of the interference creep torque to thereby equalize the magnitudes of the interference creep torque for the phase displacements of 0° and 180°. The light load adjuster 175 may then be operated to substantially fully compensate for the interference creep torque.

It is to be understood that the connections of the loops 224 and 226 may be reversed from those shown in Fig. 6 if it is observed that the magnitude of the interference creep torque is greater for a 180° phase displacement of the voltage fluxes than for the 0° displacement. Such reversed connections would provide a resultant loop of figure-of-eight configuration effective to produce a maximum compensating torque for the 180° displacement and zero torque for the 0° displacement. It is therefore observed that the compensating loops 224 and 226 may be arranged to provide a very effective compensation for the undesirable interference creep torque. In addition, the magnitude of the compensating torque may be adjusted by varying the resistance of the conductor forming the loops in any suitable manner. Such variation may conveniently be accomplished by providing an adjustable connection 232 for connecting the loops.

A third type of interference between the elements 35 and 37 is also discussed in the above-mentioned Lenehan application. This third type involves a reaction between current in the disc 39 produced by the voltage flux of one elemen and the current flux of the other element. Such interference also involves an additional reaction between current in the disc produced by voltage flux of the other element and current flux of the one element. This type of interference will be referred to hereinafter as voltage-current interference. As described in the Lenehan application, the meter 1 is provided with means for producing torques acting between the disc 39 and the elements 35 and 37 effective to compensate for torques established by voltage-current interference. As therein described, the compensating means includes a winding 233 positioned to surround the voltage pole 61 for producing when energized magnetic flux which establishes compensating currents in the disc which react with magnetic flux produced by energization of the current windings 81 of the current poles 65 and 67. The winding 233 is arranged to establish compensating torques acting between the poles 65 and 67 and the disc 39 which tend to rotate the disc in a direction opposite from the direction in which the torques established by voltage-current interference tend to rotate the disc.

The winding 233 may be energized in any suitable manner. Preferably, the winding 233 is connected for energization in accordance with voltage appearing between the phase conductors 7 and 9 as shown in Fig. 2. To this end, the winding 233 is conveniently connected in series circuit relation with respect to the voltage winding 75 of the voltage pole 45. The winding 233 is wound with respect to the winding 75 so as to establish compensating torques which act on the disc 39 in opposition with respect to the torques produced by voltage-current interference. Such arrangement is further effective to provide compensation for any phase relationship between the voltages appearing between the conductors 5 and 7 and the conductors 7 and 9.

In order to provide effective compensation, the magnitudes of the compensating torques produced by energization of the winding 233 should be substantially the same as the magnitudes of the torques established by reaction of currents in the disc produced by flux of the pole 45 with current flux of the poles 65 and 67. It has been observed that the magnitude of the portion of disc current in the region of the pole 61 produced by flux of the pole 45 is within the range of .005 to .05 of the magnitude of the portion of disc current in the region of the pole 45 produced by flux of the pole 45. The exact figure is dependent upon the size and material of the disc 39. In a specific application of the invention, this figure was found to be approximately .02. Consequently, by providing the winding 233 with a number of turns equal to approximately .02 of the number of turns of the winding 75, the magnitudes of the compensating torques produced by energization of the winding 233 is substantially equal to the magnitudes of the torques established by reaction of the disc current with current flux of the poles 65 and 67.

It is understood that compensation may be similarly provided for interference torques established by reaction between currents in the disc 39 established by magnetic flux produced by the winding 77 of the voltage pole 61 and magnetic flux produced by the windings 79 of the current poles 49 and 51. To this end, a winding 235 is positioned to surround the voltage pole 45 in the same manner as described in connection with the winding 233. The winding 235 may be similarly connected in series circuit relationship with respect to the voltage winding 77 and may have a number of turns equal to approximately .02 of the number of turns of the winding 77.

Compensating current established in the disc 39 by energization of the winding 233 includes portions which traverse the disc in the region of the magnetic structure 41. These portions react with magnetic flux of the structure 41 to establish torques acting between the structure 41 and the disc. Similarly, portions of the compensating currents established in the disc 39 by energization of the winding 235 follow paths in the disc in the vicinity of the structure 58 to produce torques acting between the structure 58 and the disc. It has been observed, however, that the magnitudes of these torques are extremely small and that the effects of such torques upon the performance of the meter may be disregarded for practical purposes.

Although the invention has been described with reference to certain specific embodiments thereof, numerous

I claim as my invention:

1. In a multielement induction instrument, a pair of electromagnetic elements, each of said elements including a magnetic structure having a first pole and a pair of spaced second poles spaced from the first pole, first winding means surrounding the first pole effective when energized to produce an alternating first magnetic flux, and second winding means surrounding the second poles effective when energized to produce an alternating second magnetic flux cooperating with the first flux to establish a shifting magnetic field; an electroconductive armature mounted for rotation about an axis relative to said structures under the influence of both of said shifting fields, the first flux of one of said structures being effective to establish current components in the armature which react with the first flux of the other of said structures to produce a first force acting between said other structure and the armature, said first poles having center lines displaced relative to each other about said axis by an angle other than 180° such that said first force tends to rotate said armature in a first direction, said center lines being in a plane on a first side of the axis, and compensating means for compensating for said first force, said compensating means comprising a magnetic member spaced from said structures and positioned in a plane intermediate and substantially equidistant from said first poles, said magnetic member establishing a magnetic path for leakage magnetic flux from both of said first winding means and having a pole face adjacent the armature on a second side of said axis substantially equally spaced from said first poles for directing said leakage magnetic flux through said armature at a position equally spaced from said first poles, said leakage magnetic flux being positioned to react with said current components to establish a compensating force which tends to rotate said armature in a second direction opposite to said first direction, said magnetic member being adjustable relative to said armature for varying the amount of said diverted flux to thereby vary the magnitude of said compensating force.

2. In a multielement induction instrument, a pair of electromagnetic elements, each of said elements including a magnetic structure, a frame assembly engaging said substructures to support the structures in operative positions, each of said structures having a first pole and a pair of spaced second poles spaced from the first pole, first winding means surrounding the first pole effective when energized to produce an alternating first magnetic flux, and second winding means surrounding the second poles effective when energized to produce an alternating second magnetic flux cooperating with the first flux to establish a shifting magnetic field; an electroconductive armature mounted for rotation about an axis relative to said structures under the influence of both of said shifting fields; the first flux of one of said structures being effective to establish current components in the armature which react with the first flux of the other of said structures to produce a first force acting between said other structure and the armature, said first poles having center lines displaced relative to each other about said axis by an angle other than 180° such that said first force tends to rotate said armature in a first direction, and compensating means for compensating for said first force, said compensating means comprising an adjustable magnetic screw in threaded engagement with said frame assembly, said magnetic screw being positioned in a plane substantially equidistant from said first poles and spaced from said axis so as to divert magnetic flux from said structures through said armature which reacts with said current components to establish a compensating force which tends to rotate the armature in a second direction opposite to said first direction, said magnetic screw being adjustable relative to said armature for varying the amount of said diverted flux to thereby vary the magnitude of said compensating force.

3. In a multielement induction watthour meter, a pair of electromagnetic elements, each of said elements including a magnetic structure having a voltage pole with a voltage pole face and a pair of spaced current poles with current pole faces, said current pole faces lying substantially in a common plane spaced from and parallel to the plane of the voltage pole face to define an air gap, voltage winding means surrounding the voltage pole effective when energized to produce an alternating voltage magnetic flux, and current winding means surrounding the current poles effective when energized to produce an alternating current magnetic flux cooperating with the voltage flux to establish a shifting magnetic field in the air gap; said magnetic structures being positioned with said air gaps in alignment in a first plane, an electroconductive disc mounted for rotation about a first axis extending transverse to said first plane relative to the magnetic structures through the aligned air gaps under the influence of the shifting magnetic fields, the voltage flux of one of said magnetic structures being effective to establish current components in the disc which react with the voltage flux of the other of said magnetic structures to produce a first force acting between said other of the magnetic structures and the disc, said voltage poles having center lines spaced along a straight line which extends transverse to said first axis spaced from said first axis such that said first force tends to rotate said disc in a first direction, and compensating means for compensating for said first force, said compensating means comprising an adjustable magnetic member positioned at the side of the disc which contains said current poles to extend along a second axis parallel to said first axis, said first axis lying intermediate said straight line and said second axis, said magnetic member being effective to divert magnetic flux from said structures through said disc which reacts with said current components for establishing a compensating force which tends to rotate the disc in a second direction opposite to said first direction.

4. In a multielement induction watthour meter, a pair of electromagnetic elements, each of said elements including a magnetic structure, a frame assembly engaging said structures to support the structures in a pair of substantially parallel planes, each of said structures having a voltage pole with a voltage pole face and a pair of spaced current poles with current pole faces, said current pole faces lying substantially in a common plane spaced from and parallel to the plane of the voltage pole face to define an air gap, voltage winding means surrounding the voltage pole effective when energized to produce an alternating voltage magnetic flux, and current winding means surrounding the current poles effective when energized to produce an alternating current magnetic flux cooperating with the voltage flux to establish a shifting magnetic field in the air gap; said magnetic structures being positioned with said air gaps in alignment in a first plane, an electroconductive disc mounted for rotation about a first axis extending transverse to said first plane relative to the magnetic structures through the aligned air gaps under the influence of the shifting magnetic fields, the voltage flux of one of said magnetic structures being effective to establish current components in the disc which react with the voltage flux of the other of said magnetic structures to produce a first force acting between said other of the magnetic structures and the disc, said voltage poles having center lines spaced along a straight line which extends substantially transverse to said first axis and to said parallel planes, said straight line being spaced from said first axis such that said first force tends to rotate said disc in a first direction, and compensating means for compensating for said first force, said compensating means comprising an adjustable magnetic screw in threaded engagement with said frame assembly at the side of the disc which contains said current poles, said screw extending along a second axis parallel to said first axis with said first axis lying intermediate said straight line and said second axis, said screw being effective to divert magnetic flux from said structures through said disc which reacts with said current components for establishing a compensating force which tends to rotate the disc in a second direction opposite to said first direction, said screw being adjustable along said second axis towards and away from the disc to vary the amount of said diverted magnetic flux for adjusting said compensating force.

5. In a multielement induction instrument, a pair of electromagnetic elements, each of said elements including a magnetic structure having a first pole and a pair of spaced second poles spaced from the first pole, first winding means surrounding the first pole effective when energized to produce an alternating first magnetic flux, and second winding means surrounding the second poles effective when energized to produce an alternating second magnetic flux cooperating with the first flux to establish a shifting magnetic field; an electroconductive armature mounted for rotation about an axis relative to said structures under the influence of both of said shifting fields, each of said magnetic structures providing a pair of magnetic paths for the associated first magnetic flux which are on opposite sides of a plane containing said axis, a first auxiliary winding linked with only one of said magnetic paths for a first one of said magnetic structures, a second auxiliary winding linked with only one of said magnetic paths for a second one of said magnetic structures, and means connecting said two auxiliary windings in series, said auxiliary windings being proportioned to compensate for variations in creep due to reversal of energization of one of said first winding means.

6. In a multielement induction instrument, a pair of electromagnetic elements, each of said elements including a magnetic structure having a first pole and a pair of spaced second poles spaced from the first pole, first winding means surrounding the first pole effective when energized to produce an alternating first magnetic flux, and second winding means surrounding the second poles effective when energized to produce an alternating second magnetic flux cooperating with the first flux to establish a shifting magnetic field; an electroconductive armature mounted for rotation about an axis relative to said structures under the influence of both of said shifting fields, the first flux of one of said structures being effective to establish current components in the armature which react with the first flux of the other of said structures to produce a first force acting between said other structure and the armature, said first poles having center lines displaced relative to each other about said axis by an angle other than 180° such that said first force tends to rotate said armature in a first direction, said center lines being in a plane on a first side of the axis, each of said magnetic structures providing a pair of magnetic paths for the associated first magnetic flux which are on opposite sides of a plane containing said axis, a first auxiliary winding linked with only one of said magnetic paths for a first one of said magnetic structures, a second auxiliary winding linked with only one of said magnetic paths for a second one of said magnetic structures, and means connecting said two auxiliary windings in series, said auxiliary windings being proportioned to compensate for variations in creep due to reversal of energization of one of said first winding means, compensating means comprising a magnetic member spaced from said structures and positioned in a plane intermediate and substantially equidistant from said first poles, said magnetic member establishing a magnetic path for leakage magnetic flux from both of said first winding means and having a pole face adjacent the armature on a second side of the axis substantially equally spaced from said first poles for directing said leakage magnetic flux through said armature at a position equally spaced from said first poles, said leakage magnetic flux being positioned to react with current components in said armature to produce a torque acting between the structures and said armature about said axis.

References Cited in the file of this patent

UNITED STATES PATENTS

| | | |
|---|---|---|
| 2,110,417 | Green | Mar. 8, 1938 |
| 2,129,010 | Kurz | Sept. 6, 1938 |
| 2,713,148 | Thevenon | July 12, 1955 |

FOREIGN PATENTS

| | | |
|---|---|---|
| 32,594 | Denmark | Nov. 27, 1923 |
| 594,892 | Germany | Mar. 23, 1934 |
| 613,805 | Germany | May 25, 1935 |
| 587,339 | Great Britain | Apr. 22, 1947 |